(12) United States Patent
Ohkubo et al.

(10) Patent No.: US 11,383,488 B2
(45) Date of Patent: Jul. 12, 2022

(54) JOINED BODY AND METHOD FOR MANUFACTURING SAME

(71) Applicant: OSAKA UNIVERSITY, Osaka (JP)

(72) Inventors: Yuji Ohkubo, Osaka (JP); Kazuya Yamamura, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 3 days.

(21) Appl. No.: 17/059,721

(22) PCT Filed: May 30, 2019

(86) PCT No.: PCT/JP2019/021452
§ 371 (c)(1),
(2) Date: Nov. 30, 2020

(87) PCT Pub. No.: WO2019/230862
PCT Pub. Date: Dec. 5, 2019

(65) Prior Publication Data
US 2021/0213705 A1  Jul. 15, 2021

(30) Foreign Application Priority Data

May 31, 2018 (JP) .............................. JP2018-105432

(51) Int. Cl.
*B32B 7/04* (2019.01)
*B32B 25/08* (2006.01)
(Continued)

(52) U.S. Cl.
CPC ............... *B32B 7/04* (2013.01); *B32B 25/08* (2013.01); *B32B 25/20* (2013.01); *B32B 27/30* (2013.01); *B32B 2310/14* (2013.01)

(58) Field of Classification Search
CPC ..... B32B 2310/14; B32B 25/08; B32B 25/20; B32B 27/30; B32B 7/04; C08J 5/12; C08J 7/00
See application file for complete search history.

(56) References Cited

U.S. PATENT DOCUMENTS

| 2011/0171480 A1 | 7/2011 | Mori et al. |
| 2016/0091841 A1* | 3/2016 | Matsumoto ........... B32B 27/281 399/333 |

(Continued)

FOREIGN PATENT DOCUMENTS

| JP | 5-147163 | 6/1993 |
| JP | 2000-17091 | 1/2000 |

(Continued)

OTHER PUBLICATIONS

International Search Report dated Sep. 3, 2019 in International (PCT) Application No. PCT/JP2019/021452.

(Continued)

*Primary Examiner* — Lawrence D Ferguson
(74) *Attorney, Agent, or Firm* — Wenderoth, Lind & Ponack, L.L.P.

(57) ABSTRACT

A joined body of a resin body containing a fluorine-based resin and a rubber body containing a vulcanized silicone rubber. It is preferable that the vulcanized silicone rubber contains a dimethylsiloxane unit. It is found that, by performing predetermined plasma treatment on the surface of a rubber body containing a vulcanized silicone rubber, the rubber body adheres to a resin body containing a fluorine-based resin.

5 Claims, 2 Drawing Sheets

(51) Int. Cl.
    *B32B 25/20*    (2006.01)
    *B32B 27/30*    (2006.01)

(56) References Cited

U.S. PATENT DOCUMENTS

2016/0362791 A1    12/2016    Yamamura et al.
2017/0282469 A1    10/2017    Yamamura et al.

FOREIGN PATENT DOCUMENTS

| JP | 2009-263529 | 11/2009 |
| JP | 2010-142573 | 7/2010 |
| JP | 2012-233038 | 11/2012 |
| JP | 2016-56363 | 4/2016 |
| JP | 2016-71344 | 5/2016 |
| WO | 2010/032728 | 3/2010 |
| WO | 2015/129675 | 9/2015 |

OTHER PUBLICATIONS

N. Zettsu et al, "A New Formation Route to form High-adhesion Polytetrafluoroethylene / Epoxy resin / SUS304 Interfaces through Plasma-assisted Morphological and Molecular Designs", Journal of the Surface Finishing Society of Japan, vol. 65, No. 5, 2014, pp. 227-233, with partial English translation.

* cited by examiner

[FIG. 1(A)]
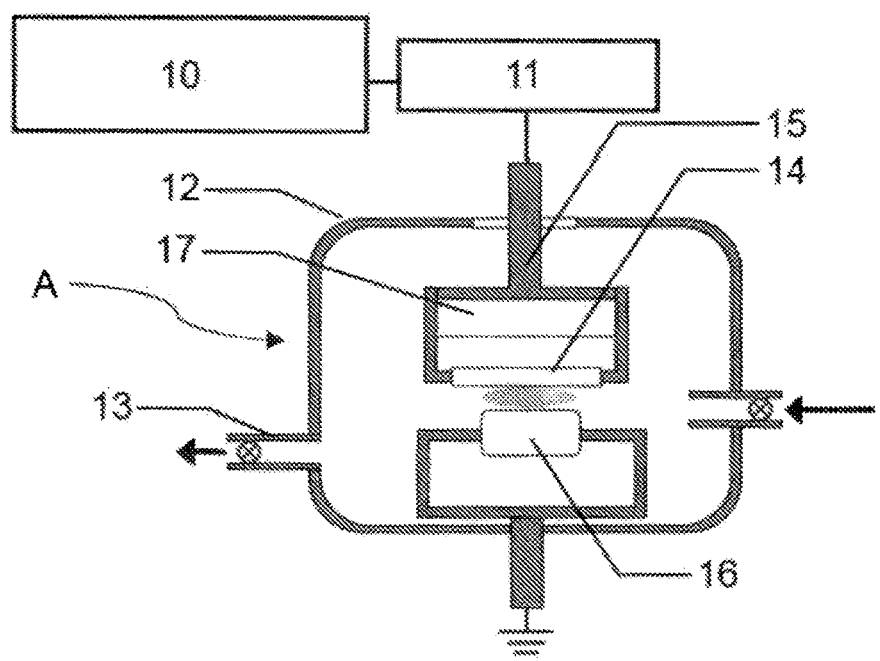
[FIG. 1(B)]
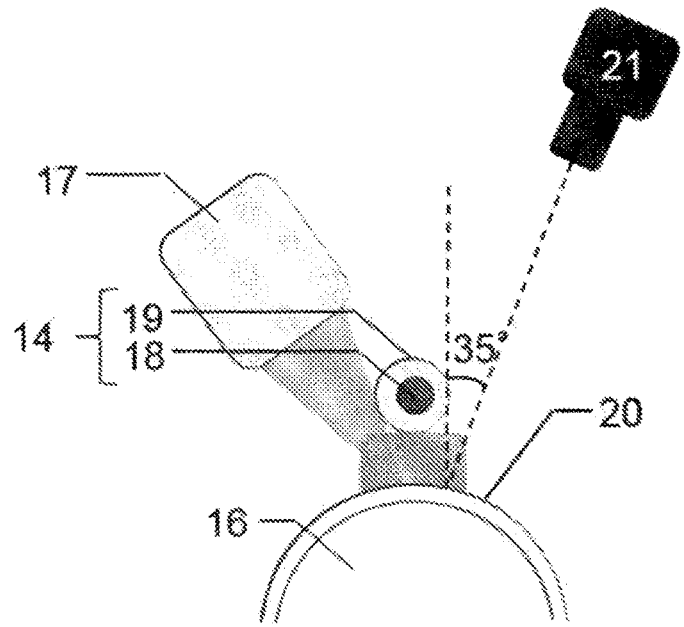

[FIG. 2]
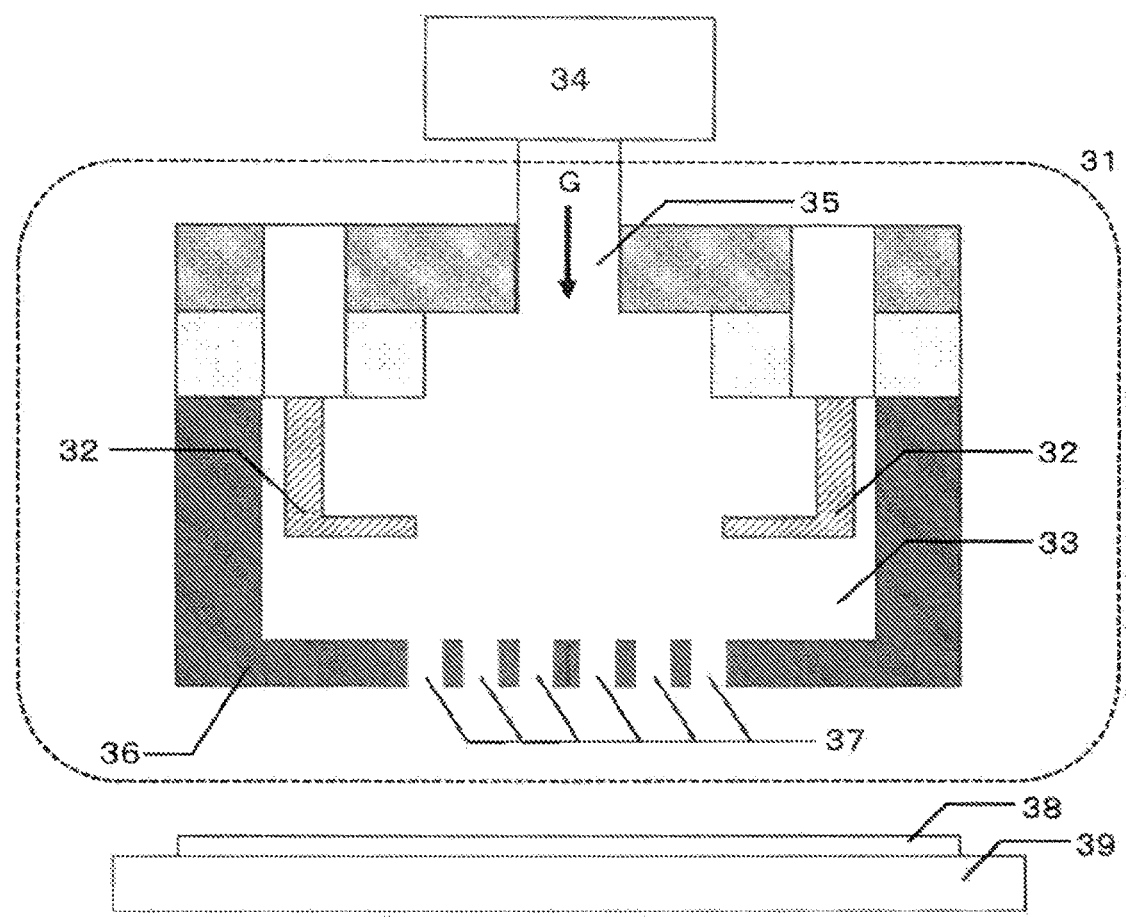

JOINED BODY AND METHOD FOR MANUFACTURING SAME

TECHNICAL FIELD

The present invention relates to a joined body and a method for manufacturing the same.

BACKGROUND ART

Conventionally, etching treatment, ultraviolet treatment, chemical vapor deposition treatment, plasma treatment, and the like have been performed in order to impart various functions to the surface of a molded body containing a fluorine-based resin. The surface of a molded body obtained through molding using a fluorine-based resin has low wettability, and it is difficult to adhere the molded body with an adhesive. Thus, etching treatment or plasma treatment is performed as treatment to improve the adhesiveness of the surface of the molded body.

Patent Literature 1 describes a surface modification method in which plasma irradiation is performed to implant ions in the plasma into the surface of a molded body and replace fluorine atoms in the surface of the molded body with atoms other than fluorine atoms. Patent Literature 2 describes a fluorine resin molded body in which the surface of a fluorine resin is modified by ion implantation to form fine protrusions thereon. Patent Literature 3 discloses a fluorine resin layer having a plasma-monomer polymerization layer on a surface thereof, and states that surface modification and grafting are performed at the same time. Patent Literature 4, for which an application was filed by the present inventors, discloses a method for manufacturing a surface-modified molded body, in which the temperature of the surface of a molded body containing an organic polymer compound is made equal to or higher than (the melting point of the organic polymer compound—120)° C. and atmospheric pressure plasma treatment is performed on the surface of the molded body to introduce peroxide radicals thereinto.

CITATION LIST

Patent Literature

Patent Literature 1: Japanese Laid-Open Patent Publication No. 2009-263529
Patent Literature 2: Japanese Laid-Open Patent Publication No. 2000-017091
Patent Literature 3: Japanese Laid-Open Patent Publication No. 2012-233038
Patent Literature 4: Japanese Laid-Open Patent Publication No. 2016-056363

SUMMARY OF THE INVENTION

Problems to be Solved by the Invention

However, it has been found that, even when the fluorine resin layer or molded body produced by the manufacturing methods described in Patent Literatures 1 to 4 is used, there is room for further research on the adhesion between the fluorine resin layer or the molded body and a vulcanized silicone rubber.

An object of the present invention is to provide a joined body of a resin body containing a fluorine-based resin and a rubber body containing a vulcanized silicone rubber.

Solution to the Problems

In view of the above problems, the present inventors have conducted earnest studies. As a result, the present inventors have found that, by performing predetermined plasma treatment on the surface of a rubber body containing a vulcanized silicone rubber, the rubber body adheres to a resin body containing a fluorine-based resin, and have completed the present invention. The summary of the present invention is as follows.

The present invention is a joined body of a resin body containing a fluorine-based resin and a rubber body containing a vulcanized silicone rubber.

It is preferable that the vulcanized silicone rubber contains a dimethylsiloxane unit.

It is preferable that the fluorine-based resin is polytetrafluoroethylene or a copolymer of a difluoromethylene unit and at least one of a hexafluoropropylene unit, a perfluoroalkyl vinyl ether unit, a methylene unit, an ethylene unit, and a perfluorodioxole unit.

It is preferable that at least one surface of the resin body and at least one surface of the rubber body are subjected to plasma treatment, and the surfaces subjected to the plasma treatment are joined to each other.

It is preferable that an adhesive strength between the resin body and the rubber body is not less than 1.0 N/mm.

In addition, the present invention includes a method for manufacturing a joined body of a resin body containing a fluorine-based resin and a rubber body containing a vulcanized silicone rubber. The method comprises the steps of: producing a surface-modified resin body by performing plasma treatment on a surface of the resin body with an oxygen concentration near the surface of the resin body being less than 0.5% by volume; producing a surface-modified rubber body by performing plasma treatment on a surface of the rubber body with an oxygen concentration near the surface of the rubber body being not less than 1% by volume; and bringing the modified surface of the surface-modified resin body and the modified surface of the surface-modified rubber body into contact with each other, and performing heating and pressurizing treatment.

Effect of the Invention

By performing predetermined plasma treatment on the surface of a rubber body containing a vulcanized silicone rubber, the rubber body was able to be adhered to a resin body containing a fluorine-based resin.

Moreover, it has been known that metal or glass adheres to the surface of a rubber body containing a vulcanized silicone rubber. Therefore, by adhering metal or glass to the surface of the rubber body in the joined body of the present invention, the resin body, the rubber body, and the metal can be stacked in this order, or the resin body, the rubber body, and the glass can be stacked in this order. That is, the resin body containing the fluorine-based resin can be adhered to metal or glass without using an adhesive.

BRIEF DESCRIPTION OF THE DRAWINGS

FIG. 1 is a conceptual diagram of an atmospheric pressure plasma treatment apparatus, wherein FIG. 1(A) is a side view of the entirety thereof and FIG. 1(B) is a plan view showing a relationship between a rod-shaped electrode and a substrate.

FIG. 2 is a conceptual diagram of a plasma irradiation head in a plasma jet treatment apparatus.

DESCRIPTION OF EMBODIMENTS

The joined body of the present invention is obtained by joining a resin body containing a fluorine-based resin (hereinafter, referred to simply as resin body) and a rubber body containing a vulcanized silicone rubber (hereinafter, referred to simply as rubber body). Preferably, the resin body and the rubber body are directly joined to each other without using an adhesive. In addition, preferably, at least one surface of the resin body and at least one surface of the rubber body are subjected to plasma treatment, and the surfaces subjected to the plasma treatment are joined to each other. In the present description, the fluorine-based resin refers to a resin containing a fluorine atom in a molecule thereof <Resin Body Containing Fluorine-Based Resin>

The fluorine-based resin is polytetrafluoroethylene or a copolymer of a difluoromethylene unit and at least one of a hexafluoropropylene unit, a perfluoroalkyl vinyl ether unit, a methylene unit, an ethylene unit, and a perfluorodioxole unit. The fluorine-based resin is preferably polytetrafluoroethylene or a copolymer of a tetrafluoroethylene unit and a hexafluoropropylene unit, a perfluoroalkyl vinyl ether unit, an ethylene unit, or a perfluorodioxole unit.

Examples of the fluorine-based resin include polytetrafluoroethylene (PTFE), polychlorotrifluoroethylene (PCTFE), polyvinylidene fluoride (PVDF), polyvinyl fluoride (PVF), tetrafluoroethylene-hexafluoropropylene copolymers (FEP), tetrafluoroethylene-perfluoroalkyl vinyl ether copolymers (PFA), tetrafluoroethylene-ethylene copolymers (ETFE), tetrafluoroethylene-perfluorodioxole copolymers (TFE/PDD), and chlorotrifluoroethylene-ethylene copolymers (ECTFE). Among them, from the viewpoint of the number of carbon-fluorine bonds (substitution ratio of fluorine atom) of the monomer unit, at least one of PTFE, PFA, ETFE, and FEP is preferable, and PTFE is particularly preferable. The fluorine-based resin may be one type or may include two or more types.

The resin body used in the present invention may contain a resin other than the above-described fluorine-based resin. Examples of the resin other than the fluorine-based resin include: olefin-based resins such as polyethylene resin, polypropylene resin, and cycloolefin resin; polyester-based resins such as polyethylene terephthalate resin; polyimide-based resins; styrene-based resins such as styrene resin and syndiotactic polystyrene resin; aromatic polyether ketone-based resins such as aromatic polyether ketone resin, polyether ether ketone resin, and polyphenylene ether resin; polyacetal-based resins; polyphenylene sulfide-based resins; bismaleimide triazine-based resins; and the like. In 100 parts by mass of the entire resin in the resin body used in the present invention, the fluorine-based resin is contained in an amount more than 50 parts by mass, preferably in an amount not less than 80 parts by mass, more preferably in an amount not less than 90 parts by mass, further preferably in an amount not less than 95 parts by mass, particularly preferably in an amount not less than 99 parts by mass, and most preferably in an amount of 100 parts by mass (only the fluorine-based resin is contained).

The form of the resin body that can be used in the present invention is not particularly limited as long as the resin body has a shape that allows later-described plasma irradiation to be performed, and bodies having various shapes and structures can be employed. Examples of the form of the resin body include, but are not limited to, a square shape, a spherical shape, a thin film shape, and the like having surface shapes such as a flat surface, a curved surface, and a bent surface. The resin body may be formed by various molding methods such as injection molding, melt extrusion, paste extrusion, compression molding, cutting molding, cast molding, and impregnation molding, depending on the characteristics of the fluorine-based resin. In addition, in the resin body, the resin may have, for example, a dense continuous structure as in a normal injection molded body, may have a porous structure, may have a non-woven fabric-like structure, or may have another structure.

<Rubber Body Containing Vulcanized Silicone Rubber>

The vulcanized silicone rubber preferably contains a siloxane unit, and more preferably contains a dimethylsiloxane unit. Normally, the vulcanized silicone rubber is produced by vulcanizing (crosslinking) a polysiloxane. The polysiloxane is not particularly limited as long as the polysiloxane has an Si—O structure, and examples of the polysiloxane include chain polysiloxanes such as polydimethylsiloxane, methylphenylpolysiloxane, and methylhydrogen polysiloxane, and cyclic polysiloxanes such as decamethylcyclopentasiloxane and dodecamethylcyclohexasiloxane. One of these polysiloxanes may be used individually, or two or more of these polysiloxanes may be used in combination. The polysiloxane preferably includes a chain polysiloxane, and more preferably includes polydimethylsiloxane (PDMS).

The rubber body used in the present invention may contain a rubber other than the vulcanized silicone rubber. Examples of the rubber other than the vulcanized silicone rubber include butadiene rubber, isoprene rubber, butyl rubber, fluororubber, ethylenepropylene rubber, nitrile rubber, and natural rubber. In 100 parts by mass of the rubber body, the vulcanized silicone rubber is contained in an amount more than 50 parts by mass, preferably in an amount not less than 80 parts by mass, more preferably in an amount not less than 90 parts by mass, further preferably in an amount not less than 95 parts by mass, particularly preferably in an amount not less than 99 parts by mass, and most preferably in an amount of 100 parts by mass (only the vulcanized silicone rubber is contained).

In 100 parts by mass of the rubber body, the amount of a crosslinking agent is preferably not less than 1 part by mass, more preferably not less than 1.5 parts by mass, and further preferably not less than 2 parts by mass, and is preferably not more than 10 parts by mass, more preferably not more than 7 parts by mass, further preferably not more than 5 parts by mass, and particularly preferably not more than 3 parts by mass.

A rubber composition may contain, as necessary, other additives that are blended in ordinary rubber compositions, such as a vulcanization accelerator, a crosslinking activator, a reinforcing agent, an acid acceptor, a plasticizer, a heat resistant agent, and a colorant. The total amount of the other additives in 100 parts by mass of the rubber body is preferably not more than 10 parts by mass, more preferably not more than 7 parts by mass, further preferably not more than 5 parts by mass, and particularly preferably not more than 3 parts by mass.

As the silicone rubber, KE-571-U, KE-1571-U, KE-951-U, KE-541-U, KE-551-U, KE-561-U, KE-961T-U, KE-1541-U, KE-1551-U, KE-941-U, KE-971T-U, etc., manufactured by Shin-Etsu Chemical Co., Ltd. can be used.

The silicone rubber is crosslinked by the crosslinking agent. Examples of the crosslinking agent include an addition reaction crosslinking agent and/or an organic peroxide crosslinking agent, and an addition vulcanized silicone rubber produced by using the addition reaction crosslinking agent is preferable.

An example of the addition reaction crosslinking agent is suitably an organohydrogen polysiloxane known as an addition reaction type crosslinking agent having two or more SiH groups (SiH bonds) in one molecule thereof. The addition reaction crosslinking agent may be one type or may include two or more types. The blending amount of the addition reaction crosslinking agent is normally 0.1 to 3.0 parts by mass per 100 parts by mass of the silicone rubber.

Moreover, although it is possible to crosslink the silicone rubber by the organic peroxide crosslinking agent alone, the organic peroxide crosslinking agent may be used as an auxiliary crosslinking agent for the addition reaction crosslinking agent in combination with the addition reaction crosslinking agent. Examples of the organic peroxide crosslinking agent include benzoyl peroxide, bis-2,4-dichlorobenzoyl peroxide, dicumyl peroxide, di-t-butyl peroxide, and 2,5-dimethyl-2,5-bis(t-butylperoxy)hexane. The blending amount of the organic peroxide crosslinking agent is normally 0.1 to 5.0 parts by mass per 100 parts by mass of the silicone rubber. The organic peroxide crosslinking agent may be one type or may include two or more types.

The addition reaction crosslinking agent is preferably used in combination with an addition reaction catalyst. As the addition reaction catalyst, a platinum group metal alone and a compound thereof are preferable, but fine-particle platinum metal adsorbed on a carrier such as silica, alumina, or silica gel, an alcohol solution of platinic chloride, chloroplatinic acid, or chloroplatinic acid hexahydrate, a palladium catalyst, a rhodium catalyst, or the like may be used. The blending amount of the addition reaction catalyst is normally 1 ppm to 1.0 part by mass per 100 parts by mass of the silicone rubber. The addition reaction catalyst may be one type or may include two or more types.

<Adhesiveness of Joined Body>

Since metal or glass adheres to the surface of a rubber body containing a vulcanized silicone rubber, metal or glass can be adhered to the surface of the rubber body of the joined body of the present invention. Therefore, the resin body, the rubber body, and metal can be stacked in this order, or the resin body, the rubber body, and glass can be stacked in this order, and the resin body containing the fluorine-based resin can be adhered to metal or glass without using an adhesive. As the glass, a resin whose surface is coated with glass may be used.

A laminate obtained by adhering metal or glass to the surface of the rubber body of the joined body of the present invention has both excellent adhesiveness between the resin body and the rubber body and excellent adhesiveness between the rubber body and the metal or glass.

<Method for Manufacturing Joined Body>

Hereinafter, an example of the method for manufacturing the joined body of the resin body containing the fluorine-based resin and the rubber body containing the vulcanized silicone rubber will be described. However, the method is not limited to the manufacturing method described below.

1. Step of Modifying Surface of Resin Body Containing Fluorine-Based Resin

In a state where oxygen is absent as much as possible near the surface of the resin body containing the fluorine-based resin, plasma treatment is performed on the surface of the resin body to sufficiently form peroxide radicals in the surface of the resin body, thereby modifying the surface of the resin body. Specifically, a surface-modified resin body may be produced by performing plasma treatment on the surface of the resin body with the oxygen concentration near the surface of the resin body (plasma irradiation region) being less than 0.5% by volume. As for the plasma treatment, for example, treatment by atmospheric pressure plasma may be performed in a state where the surface temperature of the resin body is increased, thereby modifying the surface of the resin body. By performing the atmospheric pressure plasma treatment, formation of dangling bonds due to defluorination in the surface of the resin body is induced with radicals, electrons, ions, and the like contained in the plasma. Thereafter, by exposure to the atmosphere for about several minutes to 10 minutes, a reaction with the water component in the atmosphere is caused, so that hydrophilic functional groups such as hydroxy groups and carbonyl groups are spontaneously formed in the dangling bonds in addition to peroxide radicals.

The surface of the resin body is preferably modified by performing atmospheric pressure plasma on the surface of the resin body with the surface temperature of the resin body being not lower than (the melting point of the fluorine-based resin—150)° C. By causing the surface temperature to be such a temperature, the mobility of macromolecules of the polymer compound in the surface of the resin body to be subjected to plasma irradiation is increased. If such a polymer compound with increased mobility is irradiated with plasma, when bonds each formed between a carbon atom and a carbon atom or an atom other than carbon atoms are broken in the polymer compound, crosslinking reactions occur between the carbon atoms, the bonds between which are broken in the macromolecules, whereby peroxide radicals can be sufficiently formed in the surface of the resin body. In particular, when the fluorine-based resin forming the resin body is PTFE, the surface temperature of the resin body is preferably in the above range, more preferably not lower than 180° C., and further preferably not lower than 200° C. The upper limit of the surface temperature of the resin body is not particularly limited, but may be, for example, (melting point +20)° C. or lower.

In the present invention, the surface of the resin body containing the fluorine-based resin is modified by atmospheric pressure plasma. The conditions of the treatment by atmospheric pressure plasma are not particularly limited as long as the surface temperature of the resin body and the output power density can be in the above predetermined ranges. The conditions that can be employed in technical fields for modifying the surface of a resin body by plasma and that allow atmospheric pressure plasma to be generated may be employed as appropriate.

Naturally, in the present invention, since the treatment by atmospheric pressure plasma is performed with the surface temperature of the resin body being adjusted to be in a predetermined temperature range that allows the mobility of macromolecules of the fluorine-based resin in the surface of the resin body to be increased, the atmospheric pressure plasma treatment is preferably performed under conditions by which a heating effect is obtained, in the case where the surface temperature is raised only by the heating effect of the atmospheric pressure plasma treatment.

For generating atmospheric pressure plasma, for example, a high frequency power supply having an applied voltage frequency of 50 Hz to 2.45 GHz may be used. For example, the output power density (output power per unit area) may be 15 W/cm$^2$ or greater, and the upper limit thereof is not particularly limited, but may be 40 W/cm$^2$ or less, although it cannot be said unconditionally because it depends on a plasma generator, the constituent material of the resin body, etc.

Moreover, in the case where pulsed output is used, a pulse modulated frequency may be 1 to 50 kHz (preferably 5 to 30 kHz), and a pulse duty may be 5 to 99% (preferably 15 to 80%, more preferably 25 to 70%). A cylindrical or plate-shaped metal with at least one side coated with a dielectric substance may be used as a counter electrode. The distance between mutually facing electrodes is preferably not longer than 5 mm, more preferably not longer than 3 mm, further preferably not longer than 2 mm, and particularly preferably not longer than 1 mm, from the viewpoint of plasma generation and heating, although it depends on other conditions. The lower limit of the distance between the mutually facing electrodes is not particularly limited, but may be, for example, 0.5 mm or longer.

A gas to be used for generating plasma may be, for example, rare gases such as helium, argon, and neon, and reactive gases such as oxygen, nitrogen, and hydrogen. That is, as a gas to be used in the present invention, it is preferable to use only a non-polymerizable gas.

Further, among these gases, one or more kinds of rare gases alone may be used, and alternatively, a gas mixture containing one or more kinds of rare gases and a proper amount of one or more kinds of reactive gases may be used. Plasma generation may be carried out under conditions in which the above-mentioned gas atmosphere is controlled by using a chamber or under conditions completely open to the atmosphere in which the rare gases are made to flow to electrode parts.

In the present invention, since there is almost no effect of plasma treatment on the surface, opposite to the plasma irradiation surface, of the resin body (the effects of hardness improvement, etc., are smaller than those on the plasma irradiation surface), various characteristics inherent in the fluorine-based resin (for example, chemical resistance, weather resistance, heat resistance, electrical insulation, etc.) are not impaired and are sufficiently exhibited.

Hereinafter, one example of an embodiment of atmospheric pressure plasma treatment applicable to the method for producing the resin body used in the present invention will be described mainly with the case where the resin body is in the form of a sheet (thickness: 0.2 mm) made of PTFE, with reference to the drawing. However, the present invention is not limited to such an example, and may be naturally carried out in various configurations without departing from the gist of the present invention.

FIG. 1 shows a conceptual diagram of a capacitively coupled atmospheric pressure plasma treatment apparatus which is an example of the atmospheric pressure plasma treatment apparatus that can be used in the present invention. The atmospheric pressure plasma treatment apparatus A shown in FIG. 1(A) includes a high frequency power supply 10, a matching unit 11, a chamber 12, a vacuum exhaust system 13, an electrode 14, an electrode elevating mechanism 15, a grounded cylindrical rotary stage and sample holder 16, and a rotary stage control part (not shown). The rotary stage 16 is disposed so as to face the electrode 14. As the cylindrical rotary stage and sample holder 16, for example, a stage and a holder made of an aluminum alloy can be used. As the electrode 14, an electrode having a rod shape and having a structure in which the surface of an inner tube 18 made of, for example, copper is coated with an outer tube 19 made of, for example, aluminum oxide ($Al_2O_3$) as shown in FIG. 1(B), can be used.

The method for modifying the surface of the resin body using the atmospheric pressure plasma treatment apparatus A shown in FIG. 1 is as follows. First, the resin body is washed with an organic solvent such as acetone or with water such as ultrapure water if necessary, and then a sample (resin body containing the fluorine resin) 20 in a sheet form is placed on the sample holder 16 in the chamber 12 as shown in FIG. 1(A). Then, the air in the chamber 12 is sucked through the vacuum exhaust system 13 by a suction apparatus, which is not shown, to reduce the pressure in the chamber 12, and a gas for generating plasma is supplied into the chamber 12 (see an arrow in FIG. 1(A)) to adjust the inside of the chamber 12 to be atmospheric pressure. The atmospheric pressure does not have to be strictly 1013 hPa, and may be in a range of 700 to 1300 hPa.

With the apparatus as in FIG. 1(A), plasma treatment can be performed with the oxygen concentration near the surface of the resin body (plasma irradiation region) being less than 0.5% by volume.

Next, the height (in the up-down direction in FIG. 1(A)) of the electrode elevating mechanism 15 is adjusted to move the electrode 14 to a desired position. By adjusting the height of the electrode elevating mechanism 15, the distance between the electrode 14 and the surface (upper surface) of the sample 20 can be adjusted. The distance between the electrode 14 and the surface of the sample 20 is preferably not longer than 5 mm and more preferably not longer than 2 mm. In particular, in the case where the surface temperature of the resin body is controlled to be in a specific range by natural temperature rise due to plasma treatment, the distance is particularly preferably not longer than 1.0 mm. As a matter of course, to move the sample 20 by rotation of the rotary stage 16, the electrode 14 and the sample 20 should not be brought into contact with each other.

Moreover, by rotating the rotary stage 16, a desired part of the surface of the resin body can be irradiated with plasma. For example, the rotation speed of the rotary stage 16 is preferably 1 to 3 mm/sec, but the present invention is not limited to such an example. The plasma irradiation time to the sample 20 can be adjusted, for example, by varying the rotation speed of the rotary stage 16 or by repeatedly rotating the rotary stage 16 a desired number of times.

The high frequency power supply 10 is operated while the rotary stage 16 is moved to move the sample 20, whereby plasma is generated between the electrode 14 and the rotary stage 16 and a desired area of the surface of the sample 20 is irradiated with the plasma. In this case, glow discharge can be generated under dielectric barrier discharge conditions by using, for example, a power supply having an applied voltage frequency and an output power density as described above as the high frequency power supply 10, and using, for example, an electrode made of alumina-coated copper and a sample holder made of an aluminum alloy. Thus, peroxide radicals can be produced stably in the surface of the resin body. Formation of dangling bonds due to defluorination in the surface of the PTFE sheet is induced with radicals, electrons, ions, and the like contained in the plasma, and a reaction with the water component and the like in air is caused by exposure to the air remaining in the chamber or clean air after the plasma treatment, whereby the peroxide radicals are introduced. Moreover, in the dangling bonds, hydrophilic functional groups such as hydroxy groups and carbonyl groups can be spontaneously formed in addition to peroxide radicals.

The intensity of the plasma with which the surface of the resin body is irradiated can be adjusted as appropriate on the basis of various parameters of the above-described high frequency power supply, the distance between the electrode 14 and the surface of the resin body, etc. The above-described preferable conditions (applied voltage frequency, output power density, pulse modulated frequency, pulse duty, etc.) for the atmospheric pressure plasma generation are effective particularly in the case where the resin body is in the form of a sheet made of PTFE. Moreover, it is also possible to control the surface of the resin body to be in a specific temperature range by adjusting the integrated irradiation time to the surface of the resin body in accordance with the output power density. For example, in the case where the applied voltage frequency is 5 to 30 MHz, the distance between the electrode 14 and the surface of the resin body is 0.5 to 2.0 mm, and the output power density is 15 to 30 W/cm$^2$, the integrated irradiation time to the surface of the resin body is preferably 50 seconds to 3300 seconds, more preferably 250 seconds to 3300 seconds, and particularly preferably 550 seconds and 2400 seconds. Particularly preferably, the surface temperature of the resin body in the form of a sheet made of PTFE is 210 to 327° C., and the irradiation time is 600 to 1200 seconds. In the case where the irradiation time is long, the effect by heating tends to be produced. The plasma irradiation time means the integrated time of irradiation of the surface of the resin body with plasma, and it is sufficient that the surface temperature of the resin body is (melting point—150)° C. or higher at least partially during the plasma irradiation time. For example, it is sufficient that the surface temperature of the resin body is (melting point—150)° C. or higher over ½ or longer (preferably ⅔ or longer) of the plasma irradiation time. In any embodiment, by adjusting the surface temperature of the resin body to be in the above range, the mobility of PTFE molecules in the surface of the resin body is improved, and the probability of forming carbon-carbon bonds by binding of carbon atoms of carbon-fluorine bonds in PTFE molecules broken by plasma to carbon atoms in other PTFE molecules generated in the same manner is remarkably improved, so that the surface hardness can be improved.

Moreover, heating means for heating the sample 20 can be additionally provided. A heat ray irradiation device such as a halogen heater 17 may be disposed in the vicinity of the electrode 14, as shown in FIG. 1(B), in order to directly heat the surface of the resin body, a heating device for heating the above-mentioned gas in the chamber 12 and a circulation device equipped with a stirring blade or the like for circulating the heated gas in the chamber 12 may be disposed in the chamber 12 in order to increase the environmental temperature in the chamber 12, the heating means may be disposed on the rotary stage 16 in order to heat the sample 20 from the lower surface side, or these devices may be used in combination. The heating temperature by the heating means may be set and controlled as appropriate in consideration of the characteristics of the fluorine-based resin forming the resin body, the form of the molded body, the heating effect by plasma treatment, etc. It is also preferable to preheat the molded body, before operating the high frequency power supply 10, such that the temperature of the molded body is a desired temperature at the time of plasma irradiation.

Moreover, the surface temperature of the molded body during plasma treatment can be measured by using a radiation thermometer 21 as shown in FIG. 1(B) or using a temperature measurement seal.

2. Step of Modifying Surface of Rubber Body Containing Vulcanized Silicone Rubber A surface-modified rubber body is produced by performing plasma treatment on the surface of the rubber body containing the vulcanized silicone rubber with the oxygen concentration near the surface of the rubber body (plasma irradiation region) being not less than 1% by volume. The oxygen concentration near the surface of the rubber body is more preferably not less than 3% by volume, further preferably not less than 5% by volume, particularly preferably not less than 7% by volume, and most preferably not less than 10% by volume. In addition, as for the plasma treatment on the surface of the rubber body containing the vulcanized silicone rubber, the treatment method is not particularly limited as long as plasma treatment in which the oxygen concentration near the surface of the rubber body satisfies the above condition is performed, but plasma jet treatment is preferable.

Hereinafter, an example of an embodiment of plasma jet treatment applicable to the method for producing the rubber body used in the present invention will be described with reference to the drawing. However, the present invention is not limited to such an example, and may be naturally carried out in various configurations without departing from the gist of the present invention.

FIG. 2 shows a conceptual diagram of a plasma irradiation head in a plasma jet treatment apparatus that can be used in the present invention. In the plasma irradiation head 31, plasma generated in a reaction chamber 33 is blown out toward an object to be treated (sample 38) placed outside the plasma irradiation head 31. That is, a so-called remote plasma treatment apparatus is configured. A pair of electrodes 32, 32 are disposed so as to face each other in the plasma irradiation head 31, one of both electrodes 32, 32 is connected to a power supply, and the other of both electrodes 32, 32 is electrically grounded (power supply and grounding are not shown). It is possible to generate plasma when a voltage is supplied from the power supply in a state where a gas is caused to flow into the reaction chamber 33. In the plasma irradiation head 31, a treatment gas G is introduced from a gas supply device 34 into an inflow path (gas introduction port) 35 to generate plasma (that is, plasmatized treatment gas), and the plasma is blown out through gas blowout ports 37, which is formed in a framework 36, to be sprayed to the surface of the sample (rubber body containing the vulcanized silicone rubber) 38 located below the gas blowout ports 37. The lower portions of the gas blowout ports 37 are not sealed. Thus, atmospheric air flows thereinto, and the oxygen concentration near the sample 38 is higher than the oxygen concentration in the gas G near the inflow path 35. As the gas G, at least one gas selected from the group consisting of nitrogen and air can be used. In addition, the distance between the gas blowout ports 37 and the surface of the sample 38 is preferably not longer than 50 mm and more preferably not longer than 20 mm.

By moving a stage 39 up, down, left, and right, a desired part of the sample 38 can be irradiated with plasma. For example, the movement speed of the stage 39 is preferably 0.5 to 10 mm/sec, but the present invention is not limited to such an example. The plasma irradiation time to the sample 38 can be adjusted, for example, by varying the movement speed of the stage 39 or by reciprocating the stage 39 a desired number of times.

3. Step of Contacting and Adhering Resin Body and Rubber Body

The surface-modified resin body and the surface-modified rubber body are put into a mold, and thermocompression bonding (heating and pressurizing) is performed in a state where the modified surface of the surface-modified resin body and the modified surface of the surface-modified rubber body are in contact with each other, whereby both bodies can be directly joined to each other. As a result, a joined body of the resin body and the rubber body is obtained. As for the thermocompression bonding, heating and pressurizing treatment may be performed for about 10 to 40 minutes at a heating temperature of, for example, 140 to 200° C. and a pressure of, for example, 1 to 20 MPa. In the case where both bodies have a sheet-like shape, both bodies may be stacked and compression-molded.

The mechanism by which the resin body and the rubber body can be joined (adhered) to each other and good adhesive strength (joining strength) can be achieved, has not been fully clarified, but one of conceivable mechanisms is as follows. A C—OH group or a COOH group (carboxyl group) formed due to peroxide radicals introduced into the surface of the resin body by plasma treatment, and a silanol (Si—OH) group that is present in the surface of the rubber body as a result of plasma treatment, are chemically bound to each other by hydrogen bonding or as a result of a dehydration condensation reaction. It should be noted that the mechanism for the improvement of the adhesive strength in the present invention is not limited to the above-described mechanism.

The adhesive strength between the resin body and the rubber body is preferably not less than 1.0 N/mm, more preferably not less than 1.5 N/mm, and further preferably not less than 2.0 N/mm. The method for measuring the adhesive strength will be described later.

AFM-IR, which is an apparatus having a combination of the surface form observation function of an atomic force microscope (AFM) and the functional group identification function of infrared spectroscopy (IR), has a very high spatial resolution of about 10 nm, and can clarify not only information on surface form and elastic modulus but also the distribution of functional groups that are present in the surface. When a cross-section of the joined body of the present invention (for example, a joined body of a PTFE sheet and a PDMS sheet, a joined body of a PEA sheet and a PDMS sheet, a joined body of an ETFE sheet and a PDMS sheet, a joined body of an FEP sheet and a PDMS sheet described later in Examples, etc.) is analyzed by using AFM-IR, not only the materials forming the joined body but also the surface modification depth and interface roughness by plasma treatment can be specified, so that reverse engineering is possible.

The present application claims the benefit of priority to Japanese Patent Application No. 2018-105432 filed on May 31, 2018. The entire contents of the specifications of Japanese Patent Application No. 2018-105432 filed on May 31, 2018 are hereby incorporated by reference.

EXAMPLES

Hereinafter, the present invention will be explained more concretely with reference to examples. The present invention should not be considered as being limited by the following examples, and, of course, modifications can be made appropriately without departing from the context mentioned above and below, and all of such modifications are within the technical scope of the present invention.

Example 1-1

A PTFE sheet whose surface was subjected to plasma treatment and a PDMS sheet whose surface was subjected to plasma jet treatment were produced as described below.
<PTFE Sheet>
(1) Cleaning At Nitto Denko Corporation, a PTFE sheet (Nitofion No. 900UL) cut to a thickness of 0.2 mm was cut into a certain size (width: 4.5 cm×length: 7 cm) to prepare a resin body. The resin body was ultrasonically cleaned in acetone for 1 minute and then ultrasonically cleaned in pure water for 1 minute. Then, the pure water adhering to the PTFE sheet was removed by spraying nitrogen gas (purity: 99% or more) with an air gun.

(II) High Temperature Plasma Treatment

The surface of the PTFE sheet subjected to the cleaning in the above (I) was modified with plasma by using a plasma generator (product name K2X02L023, manufactured by Meisyo Kiko Co., Ltd.) having the configuration shown in FIG. 1.

As the high frequency power supply of the plasma generator, a power supply having an applied voltage frequency of 13.56 MHz was used. As the electrode, an electrode having a structure in which a copper tube having an inner diameter of 1.8 mm, an outer diameter of 3 mm, and a length of 165 mm was coated with an alumina tube having an outer diameter of 5 mm, a thickness of 1 mm, and a length of 145 mm, was used. As the sample holder, a holder made of an aluminum alloy and having a cylindrical shape with a diameter of 50 mm and a width of 3.4 cm was used. The PTFE sheet was placed on the upper surface of the sample holder, and the distance between the surface of the resin body and the electrode was set to be 1.0 mm.

A chamber was sealed, the pressure thereof was reduced to 10 Pa with a rotary pump, and then helium gas was introduced into the chamber until the pressure reached the atmospheric pressure (1013 hPa). Thereafter, the high frequency power supply was set such that the output power density thereof was 19.1 $W/cm^2$, and a scanning stage was set so as to move at a movement speed of 2 mm/sec such that the electrode passed the scanning stage over 30 mm in the longitudinal direction of the resin body. Thereafter, the high frequency power supply was operated, the scanning stage was moved, and plasma irradiation was performed for 600 seconds in a range with width: 1.0 cm×length: 3.4 cm. The plasma irradiation time was adjusted on the basis of the number of times of reciprocation of the scanning stage by 30 mm in the longitudinal direction. In addition, when the oxygen concentration near the surface of the PTFE sheet (plasma irradiation region) was measured by using a zirconia type oxygen concentration meter LC-300 manufactured by Toray Engineering Co., Ltd., the oxygen concentration was 25.7 ppm and significantly lower than 0.5% by volume. Then, when the surface temperature of the resin body during plasma treatment was measured by a radiation thermometer (FT-H40K and FT-50A, manufactured by KEYENCE CORPORATION), the surface temperature was 203° C.
<PDMS Sheet=
(III) Preparation At HATADA Co., Ltd., 2 parts by mass of C-2513 manufactured by Shin-Etsu Chemical Co., Ltd., which is a vulcanizing agent, and 0.5 parts by mass of C-25A manufactured by Shin-Etsu Chemical Co., Ltd., which is a platinum catalyst, were blended into 100 parts by mass of Shin-Etsu Silicone (registered trademark) KE-541-U (trade name), which is an addition vulcanized silicone rubber, and additional crosslinking was carried out to form an additionally crosslinked PDMS sheet. The additionally crosslinked PDMS sheet was ultrasonically cleaned in acetone for 1 minute and then ultrasonically cleaned in pure water for 1 minute. Then, the pure water adhering to the additionally crosslinked PDMS sheet was removed by spraying nitrogen gas (purity: 99% or more) with an air gun.

(IV) Plasma Jet Treatment

The surface of the additionally crosslinked PDMS sheet subjected to the cleaning in the above (III) was modified by plasma jet treatment using an ultra-high density atmospheric pressure plasma unit (Tough Plasma FPE20, manufactured by FUJI CORPORATION) having the configuration shown in FIG. 2.

The flow rate of nitrogen gas to the plasma irradiation region was set to 29.7 L/min and the flow rate of air to the plasma irradiation region was set to 0.3 L/min, that is, the ratio of air was set to 1.0% and the ratio of oxygen was set to 0.2% when the total flow rate of nitrogen gas and air was regarded as 100%. However, the apparatus was not of a sealed type, and atmospheric air flowed in near the PDMS sheet. Thus, when the oxygen concentration in the plasma irradiation region was measured by using a zirconia type oxygen concentration meter LC-300 manufactured by Toray Engineering Co., Ltd., the oxygen concentration was 11.3%. The distance between the plasma blowout ports and the additionally crosslinked PDMS sheet was set to 10 mm, the movement speed of the stage was set to 8 mm/sec, and plasma jet treatment was performed only once without reciprocating the stage.

The surface, subjected to the plasma treatment, of the PTFE sheet, and the surface, subjected to the plasma treatment, of the PDMS sheet were brought into contact with each other, and heating and pressurizing treatment was performed for 10 minutes at a temperature of 180° C. and a pressure of 10 MPa such that a joined range was 20 mm×30 mm and an unjoined range (grasping margin) was 10 mm×30 mm, to produce a joined body of the PTFE sheet and the PDMS sheet.

Using a digital force gauge (LP-200N, manufactured by IMADA SEISAKUSHO CO., LTD.) and an electric stand (MX-500N, manufactured by IMADA SEISAKUSHO CO., LTD.) in combination, the grasping margin was pinched with chucks, a T-shaped peeling test was performed by pulling the PTFE sheet and the PDMS sheet in directions different by 180 degrees, and the adhesive strength between the PTFE sheet and the PDMS sheet was measured. A load cell was set at 1 kN, and the tensile speed was set to 60 mm/min. The results are shown in Table 1. The adhesive strength shown in Table 1 is the maximum value during the test period.

<Adhesive Strength Between Each Layer of Three-Layer Laminate Including Copper Foil>

A copper foil (manufactured by The Nilaco Corporation, model number: CU-11263, Cu purity: 99.9%, 30 mm×25 mm×0.05 mm thick) was cleaned by the method described in the above (IV) Plasma jet treatment. However, the treatment differs from the above (IV) Plasma jet treatment in that the distance between the plasma blowout ports and the copper foil was 10 mm, the movement speed of the stage was 0.8 mm/sec, and the stage was reciprocated 5 times. In addition, even when plasma jet treatment was performed on the copper foil, the surface of the copper foil was not modified. The copper foil subjected to plasma jet treatment was adhered such that the PTFE sheet, the PDMS sheet, and the copper foil were arranged in this order. For the laminate in which the copper foil was adhered, when the copper foil was fixed to an upper chuck, the PDMS sheet and the PTFE sheet were pinched with a lower chuck, and the adhesive strength between the PDMS sheet and the copper foil was measured in the above T-shaped peeling test, the adhesive strength was not less than 2.2 N/mm. In addition, when another laminate in which the copper foil was adhered was prepared and the adhesive strength between the PTFE sheet and the PDMS sheet thereof was measured in the above T-shaped peeling test, the adhesive strength was not less than 2.4 N/mm.

<Adhesive Strength Between Each Layer of Three-Layer Laminate Including Stainless Steel Foil>

A stainless steel foil (manufactured by Iwata Mfg Co., Ltd., model number: TS200-200-005, type: SUS304, 30 mm×25 mm×0.05 mm thick) was cleaned by the method described in the above (IV) Plasma jet treatment. However, the treatment differs from the above (IV) Plasma jet treatment in that the distance between the plasma blowout ports and the stainless steel foil was 10 mm, the movement speed of the stage was 0.8 mm/sec, and the stage was reciprocated 5 times. In addition, even when plasma jet treatment was performed on the stainless steel foil, the surface of the stainless steel foil was not modified. The stainless steel foil subjected to plasma jet treatment was adhered such that the PTFE sheet, the PDMS sheet, and the stainless steel foil were arranged in this order. For the laminate in which the stainless steel foil was adhered, when the stainless steel foil was fixed to an upper chuck, the PDMS sheet and the PTFE sheet were pinched with a lower chuck, and the adhesive strength between the PDMS sheet and the stainless steel foil was measured in the above T-shaped peeling test, the adhesive strength was not less than 2.3 N/mm. In addition, when another laminate in which the stainless steel foil was adhered was prepared and the adhesive strength between the PTFE sheet and the PDMS sheet thereof was measured in the above T-shaped peeling test, the adhesive strength was not less than 2.4 N/mm.

<Adhesive Strength Between Each Layer of Three-Layer Laminate Including Glass Plate>

A glass plate (manufactured by Matsunami Glass Incl., Ltd., model number: S7213, 76 mm×26 mm×1 mm thick) was adhered to the joined body such that the PTFE sheet, the PDMS sheet, and the glass plate were arranged in this order. For the laminate in which the glass plate was adhered, when the glass plate was fixed, the PDMS sheet and the PTFE sheet were pinched with a chuck, the glass plate and the PDMS sheet/the PTFE sheet were pulled in directions different by 90 degrees, and the adhesive strength between the PDMS sheet and the glass plate was similarly measured, the adhesive strength was not less than 2.0 N/mm. In addition, when another laminate in which the glass plate was adhered was prepared and the adhesive strength between the PTFE sheet and the PDMS sheet thereof was measured in the above T-shaped peeling test, the adhesive strength was not less than 2.4 N/mm.

<Adhesive Strength Between Each Layer of Three-Layer Laminate Including Glass-Coated ABS Resin>

An acrylonitrile-butadiene-styrene copolymer synthetic resin (ABS resin, 1 mm thick, 2-9229-01 manufactured by AS ONE Corporation) was irradiated with plasma by a plasma jet treatment apparatus to increase the hydrophilicity of the ABS resin. Then, a room temperature curing type $SiO_2$ coating agent (SSG Coat, ME90L, manufactured by NIT-TOBO MEDICAL CO., LTD.) was applied to the ABS resin and air-dried at room temperature for 12 hours or more to produce a glass coating film on the ABS resin. The glass-coated ABS resin was adhered to the adhered body such that the PTFE sheet, the PDMS sheet, and the glass-coated ABS resin were arranged in this order. For the laminate in which the glass-coated ABS resin was adhered, when the glass-coated ABS resin was fixed to an upper chuck, the PDMS sheet and the PTFE sheet were pinched with a lower chuck, the glass-coated ABS resin and the PDMS sheet/the PTFE sheet were pulled in directions different by 180 degrees (up and down), and the adhesive strength between the PDMS sheet and the glass-coated ABS resin was measured, the adhesive strength was not less than 2.0 N/mm. In addition, when another laminate in which the glass-coated ABS resin was adhered was prepared and the adhesive strength between the PTFE sheet and the PDMS sheet thereof was measured in the above T-shaped peeling test, the adhesive strength was not less than 2.4 N/mm.

Comparative Example 1-1

A joined body was produced in the same manner as Example 1-1, except that the treatment on the surface of the PDMS sheet was changed from (IV) Plasma jet treatment to (II) High temperature plasma treatment, and the surface of the additionally crosslinked PDMS sheet subjected to the cleaning in the above (III) was modified by plasma. The adhesive strength thereof was measured. The results are shown in Table 1.

Comparative Example 1-2

A joined body was produced in the same manner as Example 1-1, except that the treatment on the surface of the PDMS sheet was changed from (IV) Plasma jet treatment to (V) Low temperature plasma treatment described below. The adhesive strength thereof was measured. The results are shown in Table 1.

(V) Low Temperature Plasma Treatment

The surface of the additionally crosslinked PDMS sheet subjected to the cleaning in the above OW was modified with plasma by using a plasma generator (product name K2X02L023, manufactured by Meisyo Kiko Co., Ltd.) having the configuration shown in FIG. 1.

As the high frequency power supply of the plasma generator, a power supply having an applied voltage frequency of 13.56 MHz was used. As the electrode, an electrode having a structure in which a copper tube having an inner diameter of 1.8 mm, an outer diameter of 3 mm, and a length of 165 mm was coated with an alumina tube having an outer diameter of 5 mm, a thickness of 1 mm, and a length of 145 mm, was used. As the sample holder, a holder made of an aluminum alloy and having a cylindrical shape with a diameter of 50 mm and a width of 3.4 cm was used. The rubber body was placed on the upper surface of the sample holder, and the distance between the surface of the rubber body and the electrode was set to be 1.0 mm.

A chamber was sealed, the pressure thereof was reduced to 10 Pa with a rotary pump, and then helium gas was introduced into the chamber until the pressure reached the atmospheric pressure (1013 hPa). Thereafter, the high frequency power supply was set such that the output power density thereof was 7.4 W/cm$^2$, and a scanning stage was set so as to move at a movement speed of 2 mm/sec such that the electrode passed the scanning stage over 30 mm in the longitudinal direction of the rubber body. Thereafter, the high frequency power supply was operated, the scanning stage was moved, and plasma irradiation was performed for 600 seconds in a range with width: 1.0 cm×length: 3.4 cm. The plasma irradiation time was adjusted on the basis of the number of times of reciprocation of the scanning stage by 30 mm in the longitudinal direction. In addition, when the surface temperature of the rubber body during plasma treatment was measured by a radiation thermometer (FT-H40K and FT-50A, manufactured by KEYENCE CORPORATION), the surface temperature was 95° C.

Comparative Example 1-3

A joined body was produced in the same manner as Example 1-1, except that the treatment on the surface of the PTFE sheet was not performed. The adhesive strength thereof was measured. The results are shown in Table 1.

Comparative Example 1-4

A joined body was produced in the same manner as Example 1-1, except that the treatment on the surface of the PTFE sheet was changed from (II) High temperature plasma treatment to (IV) Plasma jet treatment and the surface of the PTFE sheet subjected to the cleaning in the above (I) was modified by plasma jet treatment. The adhesive strength thereof was measured. The results are shown in Table 1.

Comparative Example 1-5

A joined body was produced in the same manner as Example 1-1, except that the treatment on the surface of the PTFE sheet was changed from (H) High temperature plasma treatment to (V) Low temperature plasma treatment and the surface of the PTFE sheet subjected to the cleaning in the above (I) was modified by plasma. The adhesive strength thereof was measured. The results are shown in Table 1.

Comparative Examples 1-6 to 1-8

In Comparative Examples 1-6, 1-7, and 1-8, joined bodies were produced in the same manner as Comparative Example 1-3, Example 1-1, and Comparative Example 1-4, respectively, except that the treatment on the surface of the PDMS sheet was not performed. The adhesive strengths thereof were measured. The results are shown in Table 1.

TABLE 1

|  | Surface treatment method | | Adhesive strength |
| --- | --- | --- | --- |
|  | PFFE sheet | PDMS sheet | [N/mm] |
| Example 1-1 | High temperature plasma treatment | Plasma jet treatment | 2.4 or more |
| Comparative Example 1-1 | High temperature plasma treatment | High temperature plasma treatment | 0.003 |
| Comparative Example 1-2 | High temperature plasma treatment | Low temperature plasma treatment | 0.019 |
| Comparative Example 1-3 | — | Plasma jet treatment | 0.000 |
| Comparative Example 1-4 | Plasma jet treatment | Plasma jet treatment | 0.000 |
| Comparative Example 1-5 | Low temperature plasma treatment | Plasma jet treatment | 0.057 |
| Comparative Example 1-6 | — | — | 0.000 |
| Comparative Example 1-7 | High temperature plasma treatment | — | 0.000 |
| Comparative Example 1-8 | Plasma jet treatment | — | 0.000 |

Even when the joined body of the Example 1-1 was ultrasonically cleaned in ethanol at 22° C. for 1 minute with an ultrasonic cleaner (USK-1R, manufactured by AS ONE Corporation), the PTFE sheet and the PDMS sheet did not peel off. On the other hand, when the joined body of Comparative Example 1-4 was ultrasonically cleaned in ethanol at 22° C. for 1 minute with the ultrasonic cleaner, the PTFE sheet and the PDMS sheet peeled off. From the above, it was found that when the adhesive strength is low as in Comparative Example 1-4, peeling is easily caused if ultrasonic cleaning is merely performed.

Example 2-1, Comparative Examples 2-1 and 2-2

In Example 2-1, Comparative Example 2-1, and Comparative Example 2-2, joined bodies were produced in the same manner as Example 1-1, Comparative Example 1-1, and Comparative Example 1-2, respectively, except that the PTFE sheet was replaced with a PFA sheet (NEOFLON (registered trademark) AF series, manufactured by Daikin Industries, Ltd.). For the respective joined bodies of Example 2-1, Comparative Example 2-1, and Comparative Example 2-2, the above adhesive strength measurement was performed. The results are shown in Table 2.

TABLE 2

| | Surface treatment method | | Adhesive strength |
|---|---|---|---|
| | PFA sheet | PDMS sheet | [N/mm] |
| Example 2-1 | High temperature plasma treatment | Plasma jet treatment | 2.4 or more |
| Comparative Example 2-1 | High temperature plasma treatment | High temperature plasma treatment | 0.000 |
| Comparative Example 2-2 | High temperature plasma treatment | Low temperature plasma treatment | 0.015 |

Example 3-1, Comparative Examples 3-1 and 3-2

In Example 3-1, Comparative Example 3-1, and Comparative Example 3-2, joined bodies were produced in the same manner as Example 1-1, Comparative Example 1-1, and Comparative Example 1-2, respectively, except that the PTFE sheet was replaced with an ETFE sheet (NEOFLON (registered trademark) EF series, manufactured by Daikin Industries, Ltd.). For the respective joined bodies of Example 3-1, Comparative Example 3-1, and Comparative Example 3-2, the above adhesive strength measurement was performed. The results are shown in Table 3.

TABLE 3

| | Surface treatment method | | Adhesive strength |
|---|---|---|---|
| | ETFE sheet | PDMS sheet | [N/mm] |
| Example 3-1 | High temperature plasma treatment | Plasma jet treatment | 2.4 or more |
| Comparative Example 3-1 | High temperature plasma treatment | High temperature plasma treatment | 0.000 |
| Comparative Example 3-2 | High temperature plasma treatment | Low temperature plasma treatment | 0.000 |

Example 4-1, Comparative Example 4-1

In Example 4-1 and Comparative Example 4-1, joined bodies were produced in the same manner as Example 1-1 and Comparative Example 1-1, respectively, except that the PTFE sheet was replaced with an FEP sheet (NEOFLON (registered trademark) NF series, manufactured by Daikin Industries, Ltd.). For the respective joined bodies of Example 4-1 and Comparative Example 4-1, the above adhesive strength measurement was performed. The results are shown in Table 4.

TABLE 4

| | Surface treatment method | | Adhesive strength |
|---|---|---|---|
| | FEP sheet | PDMS sheet | [N/mm] |
| Example 4-1 | High temperature plasma treatment | Plasma jet treatment | 2.4 or more |
| Comparative Example 4-1 | High temperature plasma treatment | High temperature plasma treatment | 0.002 |

In each of Example 1-1, Example 2-1, Example 3-1, and Example 4-1 in which the high temperature plasma treatment in the above (II) was performed on various resin bodies (PFFE sheet, PEA sheet, ETFE sheet, FEP sheet) with the oxygen concentration in the plasma irradiation region being less than 0.5% by volume and the plasma jet treatment in the above (IV) was performed on the PDMS sheet with the oxygen concentration in the plasma irradiation region being not less than 1% by volume, the adhesive strength was not less than 2.4 N/mm and was very high. On the other hand, in each of Comparative Examples 1-1 to 1-8, Comparative Examples 2-1 and 2-2, Comparative Examples 3-1 and 3-2, and Comparative Example 4-1 in which the high temperature plasma treatment in the above (II) was performed on various resin bodies (RITE sheet, PFA sheet, ETFE sheet, FEP sheet) and the plasma jet treatment in the above (IV) was not performed on the PDMS sheet, the adhesive strength was significantly lower than 0.1 N/mm, and the joined body was in a state where peeling easily occurs.

DESCRIPTION OF THE NUMERALS

10 high frequency power supply
11 matching unit
12 chamber
13 vacuum exhaust system
14 electrode
15 electrode elevating mechanism
16 cylindrical rotary stage and sample holder
17 halogen heater
18 inner tube
19 outer tube
20 sample (resin body containing fluorine resin)
21 radiation thermometer
31 plasma irradiation head
32 electrode
33 reaction chamber
34 gas supply device
35 inflow path (gas introduction port)
36 framework
37 gas blowout port
38 sample (rubber body containing vulcanized silicone rubber)
39 stage
G gas

The invention claimed is:
1. A joined body of a resin body containing a fluorine-based resin and a rubber body containing a vulcanized silicone rubber,
wherein at least one surface of the resin body and at least one surface of the rubber body are subjected to plasma treatment, and the surfaces subjected to the plasma treatment are joined to each other,
an adhesive strength between the resin body and the rubber body is not less than 1.0 N/mm.

2. The joined body according to claim 1, wherein the vulcanized silicone rubber contains a dimethylsiloxane unit.

3. The joined body according to claim 1, wherein the fluorine-based resin is polytetrafluoroethylene or a copolymer of a difluoromethylene unit and at least one of a hexafluoropropylene unit, a perfluoroalkyl vinyl ether unit, a methylene unit, an ethylene unit, and a perfluorodioxole unit.

4. A method for manufacturing a joined body of a resin body containing a fluorine-based resin and a rubber body containing a vulcanized silicone rubber,
 an adhesive strength between the resin body and the rubber body is not less than 1.0 N/mm
  the method comprising the steps of:
   producing a surface-modified resin body by performing plasma treatment on a surface of the resin body with an oxygen concentration near the surface of the resin body being less than 0.5% by volume and with the surface temperature of the resin body being not lower than (the melting point of the fluorine-based resin-150°) C.;
   producing a surface-modified rubber body by performing plasma treatment on a surface of the rubber body with an oxygen concentration near the surface of the rubber body being not less than 10% by volume; and
   bringing the modified surface of the surface-modified resin body and the modified surface of the surface-modified rubber body into contact with each other, and performing heating and pressurizing treatment.

5. The joined body according to claim 1, wherein
 the surface of the resin body is subjected to plasma treatment with an oxygen concentration near the surface of the resin body being less than 0.5% by volume and with the surface temperature of the resin body being not lower than (the melting point of the fluorine-based resin-150°) C., and
 the surface of the rubber body is subjected to plasma treatment with an oxygen concentration near the surface of the rubber body being not less than 10% by volume.

* * * * *